United States Patent
Van Cleve et al.

(10) Patent No.: US 11,940,859 B2
(45) Date of Patent: Mar. 26, 2024

(54) ADJUSTING POWER CONSUMPTION LIMITS FOR PROCESSORS OF A SERVER

(71) Applicant: HEWLETT PACKARD ENTERPRISE DEVELOPMENT LP, Houston, TX (US)

(72) Inventors: Robert E. Van Cleve, Houston, TX (US); Vincent Nguyen, Houston, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 959 days.

(21) Appl. No.: 16/194,017

(22) Filed: Nov. 16, 2018

(65) Prior Publication Data
US 2020/0159303 A1    May 21, 2020

(51) Int. Cl.
*G06F 1/324* (2019.01)

(52) U.S. Cl.
CPC .................... *G06F 1/324* (2013.01)

(58) Field of Classification Search
CPC ...... G06F 1/3206; G06F 1/324; G06F 1/3243; G06F 1/3203; G06F 1/3296; Y02D 10/00
See application file for complete search history.

(56) References Cited

U.S. PATENT DOCUMENTS

| | | | |
|---|---|---|---|
| 7,058,828 B2 | 6/2006 | Barr et al. | |
| 7,134,031 B2 | 11/2006 | Flautner | |
| 9,507,405 B2 | 11/2016 | Krishnaswamy et al. | |
| 10,511,484 B1 | 12/2019 | Yu et al. | |
| 2007/0074011 A1* | 3/2007 | Borkar | G06F 1/3293 712/227 |
| 2007/0106622 A1 | 5/2007 | Boomershine et al. | |
| 2008/0282102 A1* | 11/2008 | Reddy | G06F 1/3203 713/323 |
| 2009/0144568 A1 | 6/2009 | Fung | |
| 2011/0314312 A1 | 12/2011 | Naffziger et al. | |

(Continued)

FOREIGN PATENT DOCUMENTS

WO    WO-2014160798 A2    10/2014

OTHER PUBLICATIONS

Bright Computing, Inc., "Bright Cluster Manager 6.1: Administrator Manual," 2014, 731 pages.

(Continued)

*Primary Examiner* — Jaweed A Abbaszadeh
*Assistant Examiner* — Brian J Corcoran
(74) *Attorney, Agent, or Firm* — Trop, Pruner & Hu, P.C.

(57) ABSTRACT

A method of adjusting core and un-core operating frequencies of two or more processors of a server includes determining core and un-core operating frequency variations versus power consumption limit variations of the two or more processors. The method also includes determining two or more first power consumption levels associated with the two or more processors. Each one of the two or more processors run at essentially a same target core operating frequency and at a same target un-core operating frequency at the respective first power consumption level of the processor. The method further includes adjusting the core and un-core operating frequencies of the two or more processors by setting a power consumption limit of each one of the two or more processors at the respective first power consumption level of the processor.

20 Claims, 5 Drawing Sheets

(56) References Cited

U.S. PATENT DOCUMENTS

| | | | |
|---|---|---|---|
| 2012/0005513 A1* | 1/2012 | Brock | G06F 1/324 |
| | | | 713/340 |
| 2012/0042176 A1 | 2/2012 | Kim | |
| 2012/0079290 A1 | 3/2012 | Kumar et al. | |
| 2012/0159496 A1* | 6/2012 | Dighe | G06F 1/3206 |
| | | | 718/102 |
| 2013/0111236 A1 | 5/2013 | Ananthakrishnan et al. | |
| 2014/0068290 A1 | 3/2014 | Bhandaru et al. | |
| 2014/0173297 A1 | 6/2014 | Varma et al. | |
| 2014/0181538 A1* | 6/2014 | Shrall | G06F 3/14 |
| | | | 713/300 |
| 2014/0281610 A1* | 9/2014 | Biswas | G06F 1/3296 |
| | | | 713/322 |
| 2014/0281647 A1 | 9/2014 | Bodas et al. | |
| 2014/0337646 A1* | 11/2014 | Varma | G06F 1/324 |
| | | | 713/322 |
| 2014/0380076 A1 | 12/2014 | Weissmann et al. | |
| 2015/0006915 A1* | 1/2015 | Ganesan | G06F 1/26 |
| | | | 713/300 |
| 2015/0135185 A1 | 5/2015 | Sirota et al. | |
| 2016/0077840 A1 | 3/2016 | Khatri | |
| 2016/0147291 A1 | 5/2016 | Thomas et al. | |
| 2017/0149554 A1 | 5/2017 | Gendler et al. | |
| 2017/0220362 A1 | 8/2017 | Jenne et al. | |
| 2017/0344099 A1 | 11/2017 | Qu | |
| 2018/0210532 A1* | 7/2018 | Zhang | G06F 1/324 |

OTHER PUBLICATIONS

Greg Semararo et al., "Dynamic Frequency and Voltage Control for a Multiple Clock Domain Microarchitecture," Nov. 2002, pp. 1-12, University of Rochester, NY.

\* cited by examiner

ADJUSTING POWER CONSUMPTION LIMITS FOR PROCESSORS OF A SERVER

BACKGROUND

Among processors of a server up to a five percent performance difference is observed even if they are selected from the same stock keeping unit. The processors of the server may run at different operating frequencies if they are set at the same power consumption limit. A less efficient or more leakage prone processor may be forced to lower its operating frequency compared to a more efficient processor when running at the same power consumption limit. Slower processor threads finish tasks slower adding to the total duration for finishing complex multi-processor solutions. Therefore, it is desirable to run the processors of the server at a same operating frequency to have a more predictable outcome when implementing parallel processing among the processors of the server.

Processor binning is a method of testing performances of various processors from a production batch to put the processors that perform closely (performing alike) into a same group and then use the processors from the same group in the server. Cherry picking is another method of testing performance of various processors and selecting the processors that have essentially the same performance. Both methods are costly, do not consider aging of the processors, and do not consider that different processors may age differently.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

Figure 1:
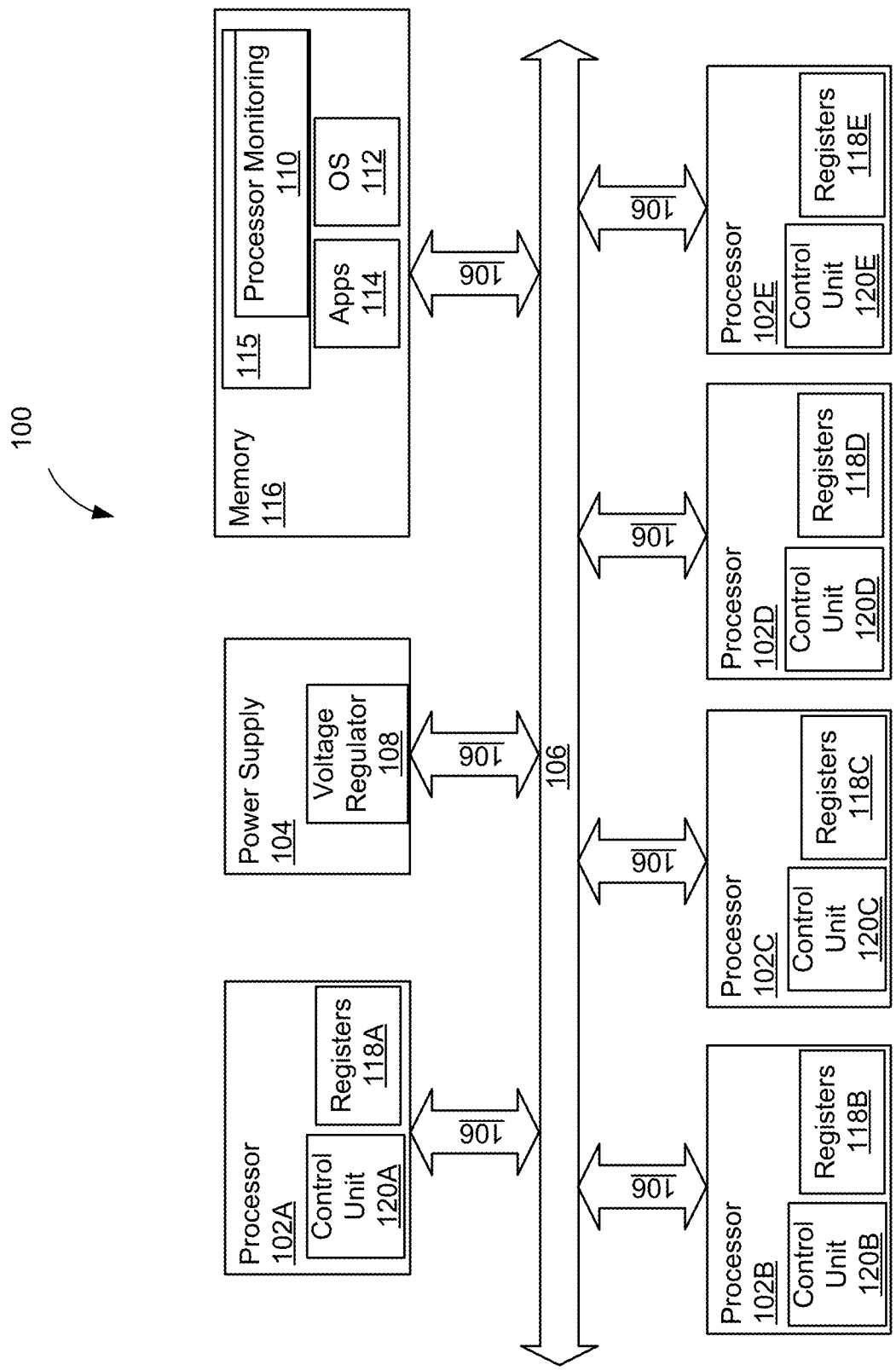
FIG. 1 illustrates a schematic diagram of an exemplary server, according to some aspects of the disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some embodiments, adjusting of core and un-core operating frequencies of two or more processors of a server are discussed. A server may include a plurality of processors that work together and perform sophisticated tasks. An operating system of the server may be a distributed operating system, may work on the plurality of servers to perform multi-processing and multitasking, and may distribute the sophisticated tasks among two or more of the processors. In order to prevent bottlenecks and one processor not needing to wait for another processor to finish a share of the task, it may be essential that the operating frequency, e.g., a clock cycle, of the processor is known to the operating system. If the operating system knows one processor is twice as faster than another processor, the operating system may distribute the task accordingly among the two processors. When having a plurality of processors, it might be easier if all the processors perform at the same operating frequency (core and un-core), and thus it may not matter for the operating system which task is assigned to which processor. In some examples, processors are available based on nominal power consumption limits and nominal operating frequencies. Processors may usually function slightly above the nominal power consumption limits. Also, processors may deviate up to five percent in operating frequency from the nominal operating frequency when working at the nominal power consumption limit. Therefore, when the processors of a server are selected with a same power and frequency rating, in practice, considerable differences may be observed among the processors.

A method of resolving the difference among processors in operating frequency is to measure the difference. At startup, the processors may be put under test and each one of the processors may perform a burn test that makes the processor execute at the operating frequency limit allowed by the power consumption limit. In some examples, the power consumption limit is modified step-by-step and the operating frequency is measured. This test may show that despite having the same power consumption and frequency ratings, the processors may not perform the same under the nominal power consumption limit. Because the processors do not perform the same and have different operating frequencies, an operating frequency within a range of variations of the different operating frequencies can be selected by, for example, averaging the operating frequencies. In some examples, the average of the operating frequencies that may be called a target operating frequency is below a first group of operating frequencies and is above a second group of operating frequencies. The processors may be tweaked such that each processor performs at the target operating frequency. The tweaking can be done by changing the power consumption limits of the processors. Thus, by decreasing the power consumption limits of the first group of processors and increasing the power consumption limits of the second group of processors different from the first group, the processors may function at the same target operating frequency. When increasing the power consumption limits, maximum ratings of the processor regarding a current supplied to the processor should also be noted. In some examples, to consider the other limitations of the processors, the target operating frequency may be reduced to a value below the average of the operating frequencies.

According to various aspects of the subject technology, a method of adjusting core and un-core frequencies of processors of a server is described. The method includes determining core and un-core operating frequency variations versus power consumption limit variations of the two or more processors. The method also includes determining, based on the determined core and un-core operating frequency variations, two or more first power consumption levels associated with the two or more processors. Each one of the two or more processors run at essentially a target core operating frequency and at a target un-core operating frequency at the respective first power consumption level. The method further includes adjusting the core and un-core operating frequencies of the two or more processors by setting a power consumption limit of each one of the two or more processors at the respective first power consumption level of the processor.

According to various aspects of the subject technology, a method of adjusting un-core frequencies of processors of a server is described. The method includes determining un-core operating frequency variations versus power consumption limit variations of the two or more processors. The method also includes determining, based on the determined un-core operating frequency variations, two or more first power consumption levels associated with the two or more processors. Each one of the two or more processors run at essentially a target un-core operating frequency at the respective first power consumption level. The method further include adjusting the un-core operating frequencies of the two or more processors by setting a power consumption limit of each one of the two or more processors at the respective first power consumption level of the processor.

According to various aspects of the subject technology, a non-transitory machine-readable storage medium encoded with instructions executable by at least one processor of a server, the machine-readable storage medium includes instructions to determine core and un-core operating frequency variations versus power consumption limit variations of two or more processors of the server. The machine-readable storage medium also includes instructions to determine, based on the determined core and un-core operating frequency variations, a base core operating frequency and a base un-core operating frequency for each one of the two or more processors. The base core operating frequency and the base un-core operating frequency of a processor correspond to a nominal power consumption limit of the processor. The machine-readable storage medium further includes instructions to determine, based on the determined core and un-core operating frequency variations, a core operating frequency offset from the base core operating frequency and an un-core operating frequency offset from the base un-core operating frequency for each one of the two or more processors. For each one of the two or more processors, the core operating frequency offset and the un-core operating frequency offset, correspond to a respective power consumption offset of the processor from the nominal power consumption limit of the processor. The machine-readable storage medium includes instructions to set the power consumption limit of each one of the two or more processors to the nominal power consumption limit plus the power consumption offset of the processor to provide a power consumption limit for the two or more processors to produce a same target core operating frequency and a same target un-core operating frequency.

FIG. 1 illustrates a schematic diagram of an exemplary server, according to some aspects of the disclosure. Server 100 of FIG. 1 includes one or more processors 102A, 102B, 102C, 102D, and 102E having respective registers 118A, 118B, 118C, 118D, and 118E and respective control units 120A, 120B, 120C, 120D, and 120E. Server 100 also includes one or more memories 116 and power supply 104 having voltage regulator 108. Server 100 also includes bus 106 that may connect the processors, the memory, and the voltage regulator of the power supply to each other. In some embodiments, bus 106 may comprise one or more of a data bus, a control bus, a system bus, a power management bus, an I2C (I squared C) bus, and a telemetry bus. In some embodiments, the one or more memories 116 may include a non-volatile memory 115. Memory 115 may include a system firmware that may be used for booting up server 100 and monitoring unit 110, which may be a separate firmware or may be included in the system firmware. Memory 116 may also include operating system (OS) 112, and one or more applications (Apps) 114. In some embodiments, monitoring unit 110 may execute on one of the processors 102A, 102B, 102C, 102D, or 102E before the operating system is loaded, e.g., during power-on self-test (POST). In some embodiments, one or more of Apps 114 may execute on processors 102A, 102B, 102C, 102D, and 102E after the operating system is loaded and may implement multi-processing. In some embodiments, processors 102A, 102B, 102C, 102D, and 102E may communicate with each other, with the one or more memories 116, and with voltage regulator 108 through bus 106.

In some embodiments, voltage regulator 108 of power supply 104 may provide information of power provided by power supply 104 to processors 102A, 102B, 102C, 102D, and 102E. Voltage regulator 108 may provide, via respective control units 120A, 120B, 120C, 120D, and 120E, data values of current, voltage, and/or power provided by power supply 104 to processors 102A, 102B, 102C, 102D, and 102E. In some embodiments, the processors receive the data values directly via an I2C (I squared C) bus, or indirectly via a telemetry bus.]Processors 102A, 102B, 102C, 102D, and 102E may keep the data values in respective registers 118A, 118B, 118C, 118D, and 118E of the processors. In some examples, control units 120A, 120B, 120C, 120D, and 120E may use the data values provided by power supply 104 to set a power consumption limit of the processors 102A, 102B, 102C, 102D, and 102E.

In some embodiments, control units 120A, 120B, 120C, 120D, and 120E of respective processors 102A, 102B, 102C, 102D, and 102E determine an average, e.g., a running average, between 1 millisecond and 10 milliseconds, of the current and voltage values and/or the amount of power provided by power supply 104. The processors may keep the average current and voltage values and/or the average power in the respective registers 118A, 118B, 118C, 118D, and 118E. In some embodiments, control units 120A, 120B, 120C, 120D, and 120E of respective processors 102A, 102B, 102C, 102D, and 102E may obtain the supplied power information in respective registers 118A, 118B, 118C, 118D, and 118E. Control units 120A, 120B, 120C, 120D, and 120E may set the operating frequency of the respective processors 102A, 102B, 102C, 102D, and 102E based on the power information that includes current and voltage values and/or the amount of power provided by the power supply 104. The power information of the processors may be stored by the system firmware of server 100 in respective registers of the processors. In some examples, the power information in the respective registers of a processor may be used as a power consumption limit and the operating frequency of the processor may be determined based on the power consumption limit.

In some embodiments, when the amount of power provided by the power supply 104 to a processor is reduced, the power information in the respective registers of the processor is reduced. In response, the operating frequency of the processor is reduced. In some embodiments, when the amount of power provided by the power supply 104 to a processor is increased, the power consumption limit in the respective registers of the processor is increased. In response, the operating frequency of the processor is increased. In some embodiments, control units 120A, 120B, 120C, 120D, and 120E store the operating frequency of the respective processor, e.g., an average of the operating frequency, in the respective registers 118A, 118B, 118C, 118D, and 118E. In some embodiments, monitoring unit 110 may further manipulate the power consumption limit, in the respective registers of the processors. In some examples, when the monitoring unit 110 increases/decreases the power consumption limit in respective registers of the processor, in response, the operating frequency of processor is increased/decreased.

In some examples, before loading the operating system, e.g., during the POST, one of the processors 102A, 102B, 102C, 102D, or 102E may load monitoring unit 110 from a memory 116, e.g., non-volatile memory 115, to execute a power burn test of monitoring unit 110. During the power burn test, monitoring unit 110 may engage each one of the processors 102A, 102B, 102C, 102D, and 102E, one by one, in exhaustive operations. During the exhaustive operations, the respective registers of each processor is changed to indicate a change in the power consumption limit of the processor. Finally, monitoring unit 110 may receive, from the respective registers of each processor, an operating frequency of each processor. Thus, monitoring unit 110 may generate a table of the variations of the operating frequency based on the variations in power setting for each processor. As discussed, voltage regulator 108 may determine the amount of current, voltage, and/or power supplied to a motherboard of the processor and not the amount of current, voltage, and/or power supplied to processor. Thus, the amount of current, voltage, and/or power supplied to the processor (power consumption data of the processor) may be estimated as a predefined factor of the amount of the current, voltage, and/or power supplied to a motherboard. The power consumption data of the processor may be stored in the respective registers of the processor. In some examples, monitoring unit 110 may receive remote commands via API scripting to set or adjust power consumption limits of the processors.

Figure 2:
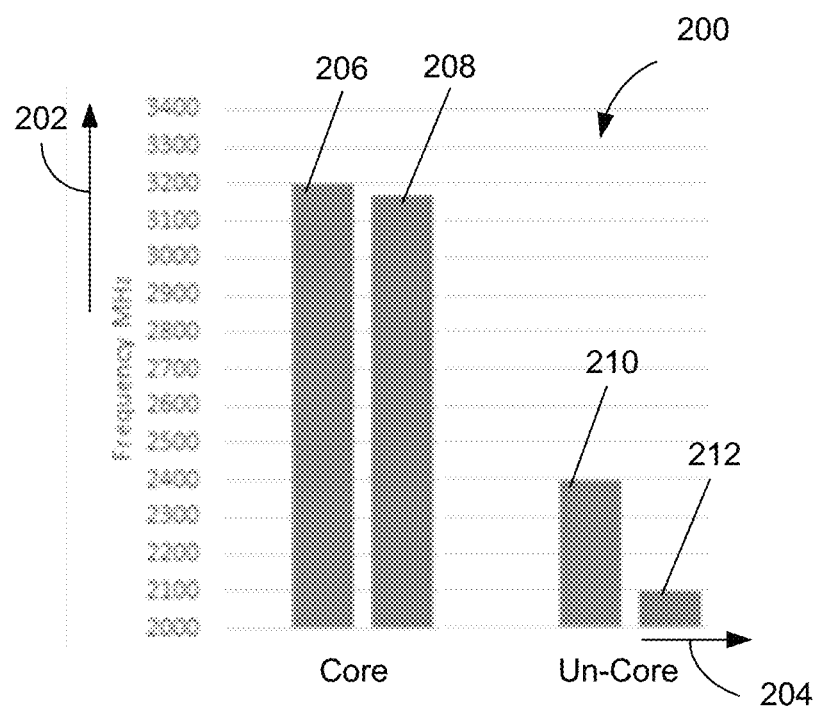
FIG. 2 illustrates a schematic diagram of exemplary core and un-core operating frequencies of two processors that are set to run at the same power consumption limit, according to some aspects of the disclosure.

FIG. 2 illustrates a schematic diagram of exemplary core and un-core operating frequencies of two processors that are set to run at the same power consumption limit, according to some aspects of the disclosure. In some examples, graph 200 of FIG. 2 includes core operating frequencies and un-core operating frequencies of two processors of a server. In some examples, a core operating frequency is a frequency of instructions performed by the CPU inside the CPU, including performing arithmetic and logic operations that involve the CPU registers. In some examples, an un-core operating frequency is a frequency of instructions that involve other elements outside the CPU, e.g., transferring data from the registers to a last level cache (LLC cache) or to system memory via a memory controller.

In some embodiments, the server may be server 100 of FIG. 1, and the processors may execute at the same power consumption limit, e.g., same thermal design power. FIG. 2 shows frequency on vertical coordinate 202 and shows a type of operating frequency on horizontal coordinate 204. As shown, the two core frequencies 206 and 208 of two processors of server 100 are not equal, with core frequency 206 being at 3200 MHz and higher than core frequency 208 that is at 3170 MHz. Thus, with regards to core instructions, the first processor associated with core frequency 206 is more efficient compared with the second processor associated with core frequency 208. FIG. 2 shows un-core operating frequencies 210 and 212 of the two processors of server 100. As shown, the two un-core operating frequencies 210 and 212 are not equal, with un-core operating frequency 210 being at 2400 MHz and higher than un-core operating frequency 212 that is at 2100 MHz. Thus, with regards to un-core instructions, the first processor associated with un-core operating frequency 210 is more efficient compared with the second processor associated with un-core operating frequency 212.

In some embodiments, when server 100 is operating, monitoring unit 110 or another application from Apps 114 may monitor the processors of server 100 and may access the registers of each processor to obtain data related to the power consumption limit, the core operating frequency, and the un-core operating frequency, of each processor and may store the obtained data in a non-volatile memory, e.g., memory 115 of FIG. 1. Thus, graph 200 of FIG. 2 may be produced by the data stored by monitoring unit 110 in memory 115. In some examples, monitoring unit 110 stores an averaged value, e.g., a running average, of the data.

In some embodiments and returning back to FIG. 1, during a boot up or during a reboot of server 100 and before operating system 112 is loaded from memory 116, one of the processors of server 100 may start executing a firmware, e.g., monitoring unit 110. Monitoring unit 110 may perform a power burn test of each processor 102A, 102B, 102C, 102D, and 102E of server 100 and may generate core operating frequencies versus power consumption data for the processors. In some examples, while gradually modifying the power consumption limit, monitoring unit 110 gradually modifies the power consumption limit of each processor, e.g., by setting a register of the processor. In some embodiments, while gradually modifying the power consumption limit of the processor, monitoring unit 110 performs burn tests that makes the processor execute at the operating frequency limit allowed by the power consumption limit. In some examples, monitoring unit 110 generates a different set of data for each one of the processors 102A, 102B, 102C, 102D, and 102E of server 100. In some embodiments, monitoring unit 110 may increase the power consumption limit of a processor until a current supplied to the processor exceeds a predefined current limit, e.g., a limit set by a manufacturer of the processor. In some embodiments, power consumption limits of processors 102A, 102B, 102C, 102D, and 102E of server 100 may be adjusted such that the core and un-core operating frequencies of processors 102A, 102B, 102C, 102D, and 102E become optimized, e.g., become equal. Optimizing the core and un-core operating frequencies of the processors are described in more details with respect to FIG. 6.

Figure 3:
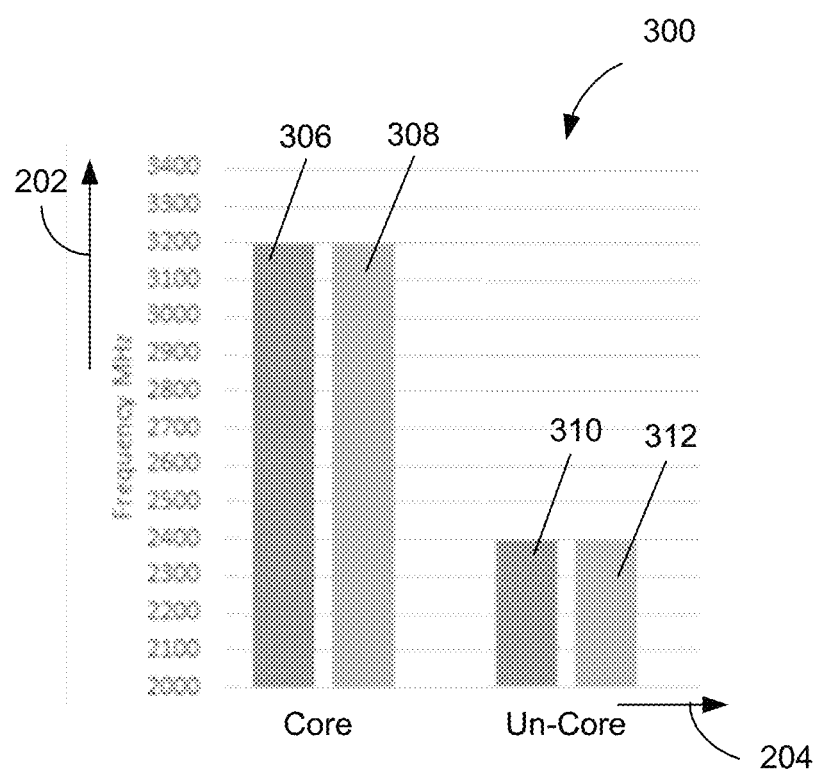
FIG. 3 illustrates a schematic diagram of exemplary core and un-core frequencies of two processors when the power consumption limits are adjusted, according to some aspects of the disclosure.

FIG. 3 illustrates a schematic diagram of exemplary core and un-core frequencies of two processors when the power consumption limits are adjusted, according to some aspects of the disclosure. In some examples, graph 300 of FIG. 3 is shown on the same coordinates 202 and 204 of FIG. 2 and includes core operating frequencies and un-core operating frequencies of the two processors of FIG. 2 when the power consumption limits are adjusted. In some examples as shown in FIG. 3, the power limits of the two processors are optimized such that the two processors execute at the same core operating frequency and/or un-core operating frequency. As shown, the two core frequencies 306 and 308 of two processors of server 100 are equal at 3200 MHz and two un-core frequencies 310 and 312 of the two processors of server 100 are also equal at 2400 MHz. Thus, the power consumption limit of the first processor may not be changed and the power consumption limit of the second processor may be increased such that the second processor may perform at the same core and un-core frequencies of the first processor.

Figure 4:
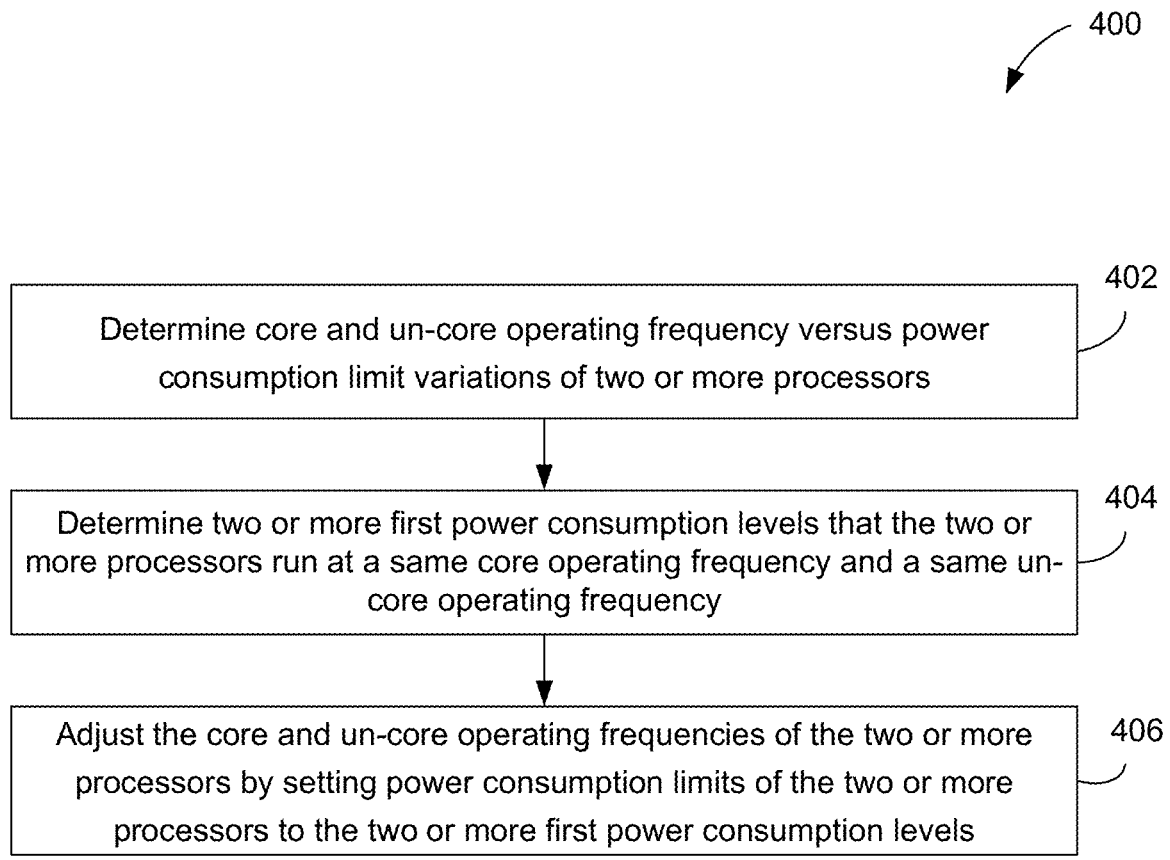
FIG. 4 illustrates a flow diagram of an exemplary process for adjusting core and un-core operating frequencies of the processors of a server, according to some aspects of the disclosure.

FIG. 4 illustrates a flow diagram of an exemplary process for adjusting core and un-core operating frequencies of the processors of a server, according to some aspects of the disclosure. Process 400 may be used for adjusting core and un-core operating frequencies of server 100 of FIG. 1. Notably, one or more steps of process 400 described herein may be omitted, performed in a different sequence, and/or combined with other processes for various types of applications contemplated herein. Process 400 can be performed by monitoring unit 110 on one of the processors of FIG. 1, to determine power consumption limits of the processor such that the processors execute at equal core and un-core operating frequencies.

Process 400 begins at step 402, where the core and un-core operating frequency versus power consumption limit variations of two or more processors are determined. As discussed, monitoring unit 110 may perform a power burn test of the two or more processors by making the processors run at the core and un-core operating frequency limits allowed by the power consumption limit set for the processor. The variations may be obtained by varying the power consumption limit in a plurality of steps and measuring the core and un-core operating frequency at each step to generate the core and un-core operating frequency variations. In some examples, the core and un-core operating frequency versus power consumption limit variations is stored in a non-volatile memory, e.g., memory 115 of FIG. 1. In some examples, the core and/or un-core operating frequency versus power consumption limit variations may be extrapolated to low operating frequencies, e.g., extrapolated to zero frequency, to determine power consumption of elements of motherboard besides the processor. In some examples, the processors may be categorized using a static workload generator to simulate application workloads and core and un-core operating frequencies of the processor may be determined, e.g., obtained.

In step 404, two or more first power consumption levels are determined that the two or more processors run at a same core operating frequency and a same un-core operating frequency. The determination of the same core operating frequency and the same un-core operating frequency is described with respect to FIG. 6 and may be performed by monitoring unit 110.

In step 406, the core and un-core operating frequencies of the two or more processors are adjusted by setting power consumption limits of the two or more processors to the two or more first power consumption levels. Returning back to FIG. 1, the power consumption limits of processors 102A, 102B, 102C, 102D, and 102E may be set to first power consumption levels by monitoring unit 110 and by setting registers of the processors.

Figure 5:
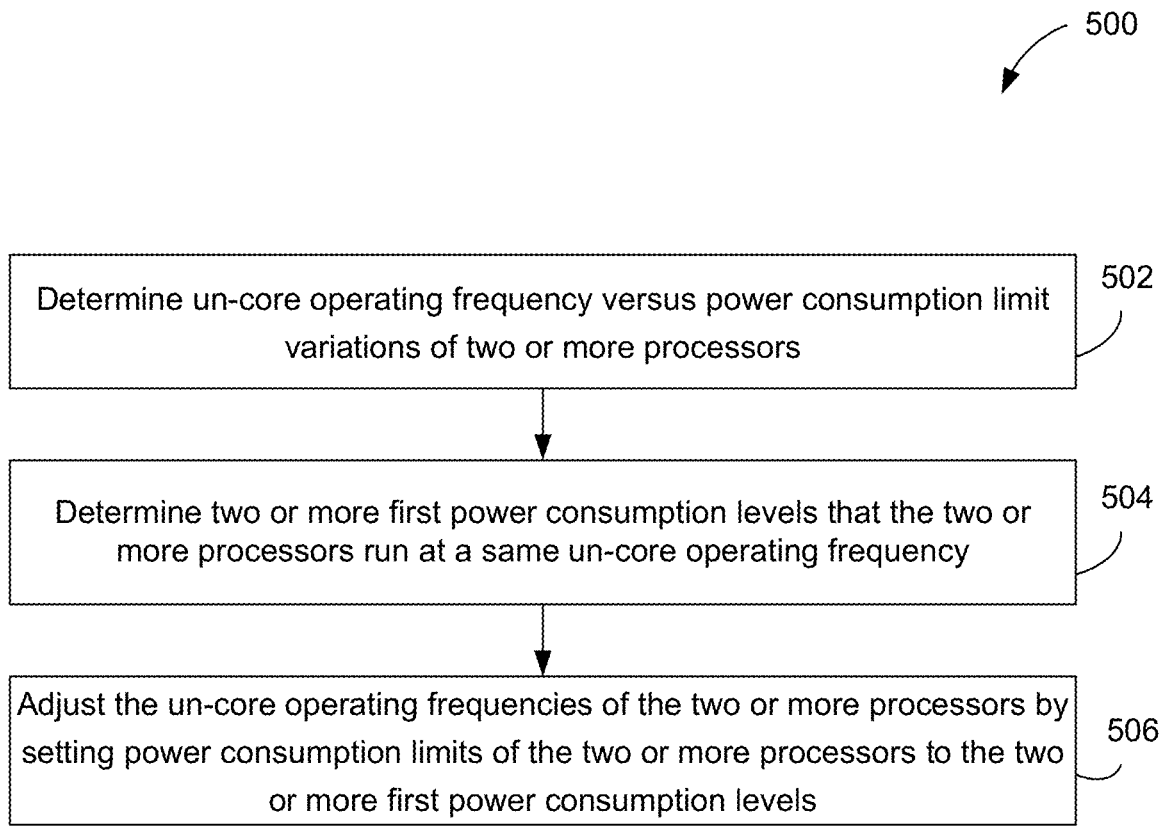
FIG. 5 illustrates a flow diagram of an exemplary process for adjusting un-core operating frequencies of the processors of a server, according to some aspects of the disclosure.

FIG. 5 illustrates a flow diagram of an exemplary process for adjusting un-core operating frequencies of the processors of a server, according to some aspects of the disclosure. Process 500 may be used for adjusting un-core operating frequencies of server 100 of FIG. 1. Notably, one or more steps of process 500 described herein may be omitted, performed in a different sequence, and/or combined with other processes for various types of applications contemplated herein. Process 500 can be performed by monitoring unit 110 on one of the processors of FIG. 1, to determine power consumption limits of the processor such that the processors perform at equal un-core operating frequencies.

Process 500 begins at step 502, where the un-core operating frequency versus power consumption limit variations of two or more processors are determined. Similarly, monitoring unit 110 may perform a power burn test of the two or more processors by making the processors to execute at the un-core operating frequency limit allowed by the power consumption limit set for the processor. The variations may be obtained by varying the power consumption limit in a plurality of steps and measuring the un-core operating frequency at each step to generate the un-core operating frequency variations. In some examples, the un-core operating frequency versus power consumption limit variations data is stored in a non-volatile memory.

In step 504, two or more first power consumption levels that the two or more processors run at a same un-core operating frequency are determined. The determination of the same un-core operating frequency is described with respect to FIG. 6 and may be performed by monitoring unit 110.

In step 506, the un-core operating frequencies of the two or more processors are adjusted by setting power consumption limits of the two or more processors to the two or more first power consumption levels. Returning back to FIG. 1, the power consumption limits of processors 102A, 102B, 102C, 102D, and 102E may be set to first power consumption levels by monitoring unit 110 and by setting the registers of the processors.

Figure 6:
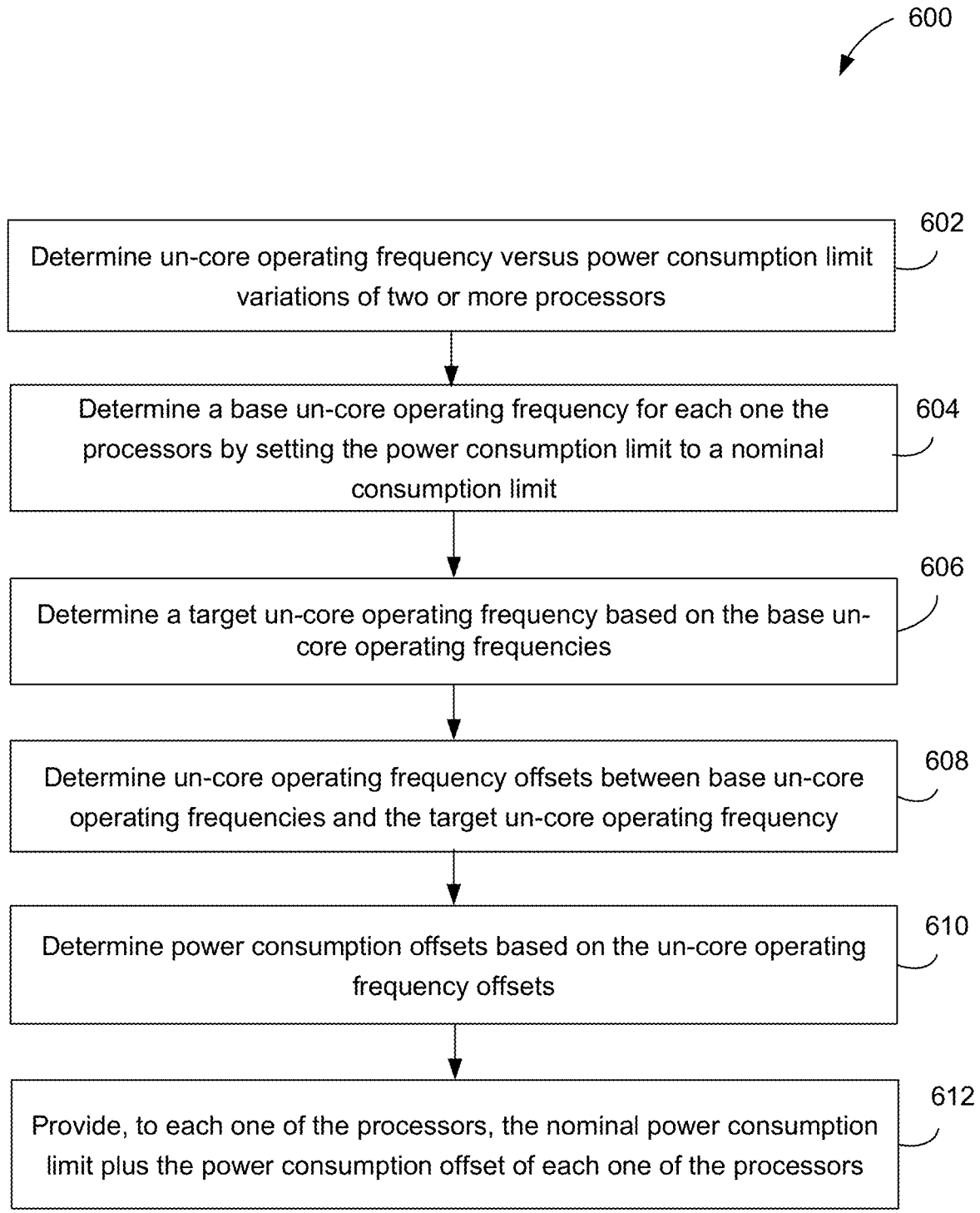
FIG. 6 illustrates a flow diagram of an exemplary process for adjusting un-core operating frequencies of the processors of a server, according to some aspects of the disclosure.

FIG. 6 illustrates a flow diagram of an exemplary process for adjusting un-core operating frequencies of the processors of a server, according to some aspects of the disclosure. Process 600 may be used for adjusting un-core operating frequencies of server 100 of FIG. 1. Notably, one or more steps of process 600 described herein may be omitted, performed in a different sequence, and/or combined with other processes for various types of applications contemplated herein. Process 600 can be performed by monitoring unit 110 on one of the processors of FIG. 1, to determine power consumption limits of the processor such that the processors execute at equal un-core operating frequencies.

Process 600 begins at step 602 which is performed the same as step 502 of process 500. Also, step 602 may be performed the same as step 402 of process 400.

In step 604, a base un-core operating frequency for each one of the processors may be determined by setting the power consumption limit to a nominal power consumption limit of each processor. In some examples, the two or more processors of the server, e.g., server 100, may be selected such that they have the same nominal power consumption limits and they have essentially the same core and un-core operating frequencies at the nominal power consumption limit. In some examples, in practice, when the power consumption limits of the processors are set at the same nominal consumption limit, due to difference in efficiency of the processors, the base un-core operating frequencies obtained may not be the same and may show up to a five percent difference. In some embodiments, at step 604, a base core operating frequency for each one of the processors may be obtained by setting the power consumption limit to the nominal power consumption limit of each processor. Also, due to difference in efficiency of the processors, the base core operating frequencies may not be the same and may show up to a five percent difference. In some examples, process 600 may be used for optimizing the processors of a server when the nominal power consumption limits of the processor and the nominal core and un-core operating frequencies of the processors are up to twenty percent different. In some examples, the nominal power consumption limit of the processor of a server may be set to between 100 volts and 250 volts.

In step 606, a target un-core operating frequency is determined based on the base un-core operating frequencies. In some embodiments, the power consumption limits of the processor of the server are adjusted such that each one of the processors of the server perform at the same target un-core operating frequency. Additionally, a target core operating frequency may be determined based on the base core operating frequencies such that at the adjusted power consumption limits, the processors of the server perform at the same target core operating frequency and at the same target un-core operating frequency. In some embodiments, the target un-core operating frequency may be determined by averaging the two or more base un-core operating frequencies. In some embodiments, the target core operating frequency may be determined by averaging the two or more base core operating frequencies. In some embodiments, the target un-core operating frequency may be determined by finding a median of the two or more base un-core operating frequencies. In some embodiments, the target core operating frequency may be determined by finding a median of the two or more base core operating frequencies. In some embodiments, the target un-core operating frequency may be determined by finding a maximum or a minimum of the two or more base un-core operating frequencies. In some embodiments, the target core operating frequency may be determined by finding a maximum or minimum of the two or more base core operating frequencies.

In step 608, un-core operating frequency offsets between the base un-core operating frequencies and the target un-core operating frequency are determined. Additionally, core frequency offsets between the base core operating frequencies and the target core operating frequency may be determined. As described, the power consumption limits of the processors of the server may be adjusted such that each one of the processors perform at the target core operating frequency and at the target un-core operating frequency. When the target core operating frequency and the target un-core operating frequency are averages of the base core operating frequencies and the base un-core operating frequencies, then the core and un-core frequency offsets may be positive and negative values.

In step 610, power consumption offsets are determined based on the un-core operating frequency offsets. Additionally, power consumption offsets may be determined based on the core and un-core operating frequency offsets. As described, the core and un-core operating frequencies may be modified by adjusting the power consumption limits of the processors such that the processors operate at optimized core and un-core operating frequencies. In some embodiments, when the core and/or un-core frequency offsets are positive and negative values, the power consumption offsets are also positive and negative values. By applying a negative power consumption offset, the operating frequency (core and un-core) of the processor may be reduced, and by applying a positive power consumption offset, the operating frequency (core and un-core) of the processor may be increased. Thus, by increasing the operating frequency of some of the processor and decreasing the operating frequency of other processors, each one of the processors may operate at the target operating frequency.

In step 612, the nominal power consumption limit plus the power consumption offset of each one of the processors is provided to each processor. When registers of the processors are set such that the power consumption limit of each processor is set at a respective nominal power consumption limit of the processor plus the power consumption offset of the processors, then the processors operate at the target core operating frequency and at the target un-core operating frequency. In some embodiments, monitoring unit 110 may detect a removal of a processor or an addition of a new processor and may accordingly adjust the target core and un-core operating frequencies. In some embodiments, when operating at the target core operating frequency and at the target un-core operating frequency, a performance of the processors may match and the server provides a consistent and deterministic performance. When operating at the target core operating frequency and at the target un-core operating frequency, a processor assigned task may finish more predictably and a processor may not need to wait for another processor.

In some embodiments, deterministic performance of a server, e.g., server 100 of FIG. 1, is a desired characteristic. One method of making the servers deterministic, e.g., predictable, is measuring the operating frequencies of the processors of the servers and adjusting the operating frequencies according to a predefined scheme, e.g., setting the operating frequencies to an equal operating frequency. In some embodiments, a firmware-based technology may optimize and match frequencies between two or more processors in a multiprocessor server. The firmware based technology may use a firmware before the operating system is loaded, e.g., during power on self-test (POST), to measure the operating frequency versus the power consumption of the processors. A batch of processors can vary in the power consumed under a same load condition based on physical characteristics of the silicon and manufacturing process. The difference in power consumption of the processors may result in operating frequencies of two or more processors not being the same when the processors are set at the same power consumption limit. The difference in operating frequencies of the processors of the server may cause less predictable performance of the server.

In some embodiments, voltage regulator 108 of power supply 104 of server 100 may measure the current supplied to each processor of the server. In fact, voltage regulator 108 may monitor the current supplied to a motherboard of each processor and based on a predefined proportionality factor of the current to motherboard, may determine the current supplied to a processor of the motherboard. In some embodiments, monitoring unit 110 may communicate with voltage regulator 108 through bus 106 and may monitor a voltage supplied to each motherboard and thus can monitor the power supplied to each motherboard and the power supplied to each processor of the motherboard. In some examples, a control unit of each processor may receive data about the supplied current, voltage, and/or power of each processor and may set the registers according to the received data. In some examples, the control unit of the processor may communicate with the voltage regulator 108 and/or monitoring unit 110 via bus 106 to receive the data. As described the system firmware, e.g., monitoring unit 110 of the system firmware, may set the respective registers of the processors to set the power consumption limits of the processors.

The present disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

A reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

As used herein, the phrase "at least one of" preceding a series of items, with the term "or" to separate any of the items, modifies the list as a whole, rather than each item of the list. The phrase "at least one of" does not require selection of at least one item; rather, the phrase allows a meaning that includes at least one of any one of the items, and/or at least one of any combination of the items, and/or at least one of each of the items. By way of example, the phrase "at least one of A, B, or C" may refer to: only A, only B, or only C; or any combination of A, B, and C.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

It is understood that the specific order or hierarchy of steps, operations, or processes disclosed is an illustration of exemplary approaches. Based upon design preferences, it is understood that the specific order or hierarchy of steps, operations or processes may be rearranged. Some of the steps, operations, or processes may be performed simultaneously. Some or all of the steps, operations, or processes may be performed automatically, without the intervention of a user. The accompanying method claims, if any, present elements of the various steps, operations, or processes in a sample order, and are not meant to be limited to the specific order or hierarchy presented.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "module for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

What is claimed is:

1. A method of adjusting core and un-core operating frequencies of two or more processors of a server, the method comprising:
    determining core and un-core operating frequency variations versus power consumption limit variations of the two or more processors;
    determining, based on the determined core and un-core operating frequency variations, two or more first power consumption levels associated with the two or more processors, wherein at a respective first power consumption level, each one of the two or more processors run at essentially a target core operating frequency and at a target un-core operating frequency; and
    adjusting the core and un-core operating frequencies of the two or more processors by setting a power consumption limit of each one of the two or more processors at the respective first power consumption levels.

2. The method of claim 1, further comprising:
    determining, based on the determined core and un-core operating frequency variations, a base core operating frequency and a base un-core operating frequency for each one of the two or more processors, wherein the base core operating frequency and the base un-core operating frequency of a processor correspond to a respective predefined power consumption limit of the processor;
    determining, based on the determined core and un-core operating frequency variations, a core operating frequency offset from the base core operating frequency and an un-core operating frequency offset from the base un-core operating frequency for each one of the two or more processors, wherein for each one of the two or more processors, the core operating frequency offset and the un-core operating frequency offset correspond to a respective power consumption offset of the processor from the predefined power consumption limit of the processor; and
    setting the power consumption limit of each one of the two or more processors to the respective predefined power consumption limit plus the power consumption offset of the processor, the setting provides the respective first power consumption level for the power consumption limit of the processor to operate at the target core operating frequency and the target un-core operating frequency.

3. The method of claim 2, wherein for each one of the two or more processors a sum of the base core operating frequency and the core operating frequency offset provide the target core operating frequency, and a sum of the base un-core operating frequency and the core operating frequency offset provide the target un-core operating frequency.

4. The method of claim 2, wherein a nominal power consumption limit of the two or more processors of the server are equal, and wherein the respective predefined power consumption limit of each one of the two or more processors is the nominal power consumption limit.

5. The method of claim 2, wherein for each one of the two or more processors the base core operating frequency and the base un-core operating frequency is determined when the processors implement a same predefined power consumption limit.

6. The method of claim 1, further comprising:
executing a firmware during power-on self-test (POST) operation to determine the core and un-core operating frequency variations versus the power consumption limit variations of the two or more processors by varying the power consumption limit, wherein the firmware performs a power burn test on each one of the two or more processors that makes the processor execute at an operating frequency limit allowed by the power consumption limit of the processor.

7. The method of claim 1, wherein the power consumption limits are peak power limits.

8. The method of claim 1, wherein the core operating frequency is a frequency of instructions performed by a processor inside the processor and involving registers of the processor, and wherein the un-core operating frequency is a frequency of instructions performed by the processor involving elements outside the processor.

9. A method of adjusting un-core operating frequencies of two or more processors of a server, the method comprising:
determining un-core operating frequency variations versus power consumption limit variations of the two or more processors;
determining, based on the determined un-core operating frequency variations, two or more first power consumption levels associated with the two or more processors, wherein at a respective first power consumption level, each one of the two or more processors run at essentially a target un-core operating frequency; and
adjusting the un-core operating frequencies of the two or more processors by setting a power consumption limit of each one of the two or more processors at the respective first power consumption level.

10. The method of claim 9, further comprising:
determining, based on the determined un-core operating frequency variations, a base un-core operating frequency for each one of the two or more processors, wherein the base un-core operating frequency of a processor corresponds to a respective predefined power consumption limit of the processor;
determining, based on the determined un-core operating frequency variations, an un-core operating frequency offset from the base un-core operating frequency for each one of the two or more processors, wherein for each one of the two or more processors, the un-core operating frequency offset of the processor corresponds to a respective power consumption offset from the predefined power consumption limit of the processor; and
setting the power consumption limit of each one of the two or more processors to the respective predefined power consumption limit plus the power consumption offset of the processor, the setting provides the first power consumption level for the power consumption limit of the processor to operate at the target un-core operating frequency.

11. The method of claim 10, wherein for each one of the two or more processors, a sum of the base un-core operating frequency and the un-core operating frequency offset provides the target un-core operating frequency.

12. The method of claim 10, wherein nominal power consumption limits of the two or more processors of the server are equal, and wherein the respective predefined power consumption limit of each one of the two or more processors is the nominal power consumption limit.

13. The method of claim 10, wherein for each one of the two or more processors, the base un-core operating frequency is determined when the processors implement a same predefined power consumption limit.

14. The method of claim 9, further comprising:
executing a firmware during power-on self-test (POST) operation to determine the un-core operating frequency variations versus the power consumption limit variations of the two or more processors.

15. The method of claim 9, wherein the power consumption limits are peak power limits.

16. The method of claim 9, wherein the power consumption limits are total dissipated power limits.

17. The method of claim 10, further comprising:
determining, based on the determined un-core operating frequency variations, a base un-core operating frequency for each one of the two or more processors, wherein the base un-core operating frequency of a processor corresponds to a nominal power consumption limit of the processor;
determining the target un-core operating frequency based on two or more base un-core operating frequencies;
determining a respective un-core operating frequency offset for each one of the two or more processors as a difference between the respective base un-core operating frequency of the processor and the target un-core operating frequency;
determining, based on the determined un-core operating frequency variations, two or more power consumption offsets from nominal power consumption limits of the two or more processors, wherein a respective power consumption offset corresponds to the un-core operating frequency offset of the processor from the target un-core operating frequency; and
setting the power consumption limit of each one of the two or more processors to the nominal power consumption limit plus the power consumption offset of the processor, wherein to provide the first power consumption levels for the processors to operate at the target un-core operating frequency.

18. The method of claim 17, further comprising:
determining target un-core operating frequency by averaging the two or more base un-core operating frequencies.

19. The method of claim 18, wherein the nominal power consumption limits of the two or more processor of the server are equal, and wherein the two or more power consumption offsets are positive and negative values.

20. A non-transitory machine-readable storage medium encoded with instructions executable by at least one processor of a server including two or more processors, the machine-readable storage medium comprising instructions to:

determine core and un-core operating frequency variations versus power consumption limit variations of the two or more processors;

determine, based on the determined core and un-core operating frequency variations, a base core operating frequency and a base un-core operating frequency for each one of the two or more processors, wherein the base core operating frequency and the base un-core operating frequency of a processor correspond to a nominal power consumption limit of the processor;

determine, based on the determined core and un-core operating frequency variations, a core operating frequency offset from the base core operating frequency and an un-core operating frequency offset from the base un-core operating frequency for each one of the two or more processors, wherein for each one of the two or more processors, the core operating frequency offset and the un-core operating frequency offset correspond to a respective power consumption offset of the processor from the nominal power consumption limit of the processor; and set the power consumption limit of each one of the two or more processors to the nominal power consumption limit plus the power consumption offset of the processor to provide a power consumption limit for the two or more processors to produce a same target core operating frequency and a same target un-core operating frequency.

* * * * *